United States Patent
Kromminga et al.

(10) Patent No.: US 7,631,701 B2
(45) Date of Patent: Dec. 15, 2009

(54) RIGID STANDARD BEARING SHIELD DISK SCRAPER SYSTEM

(75) Inventors: Gaylen J. Kromminga, Morton, IL (US); Aaron Beyer, Roanoke, IL (US); Rickey Gerber, Roanoke, IL (US); Scott Faust, Philo, IL (US); Mark P. Hoffman, Deer Creek, IL (US)

(73) Assignee: CNH America LLC, New Holland, PA (US)

( * ) Notice: Subject to any disclaimer, the term of this patent is extended or adjusted under 35 U.S.C. 154(b) by 274 days.

(21) Appl. No.: 11/742,260

(22) Filed: Apr. 30, 2007

(65) Prior Publication Data

US 2008/0264657 A1  Oct. 30, 2008

(51) Int. Cl.
*A01B 17/00* (2006.01)

(52) U.S. Cl. .................. 172/508; 172/558; 384/624

(58) Field of Classification Search .......... 172/558, 172/556, 508, 509, 512, 513, 517, 516, 112, 172/519; 280/855; 384/624, 116
See application file for complete search history.

(56) References Cited

U.S. PATENT DOCUMENTS

| | | | |
|---|---|---|---|
| 501,917 A | 7/1893 | Caldwell | |
| 682,505 A * | 9/1901 | Strong | 172/603 |
| 693,891 A | 2/1902 | Packham et al. | |
| 735,487 A | 8/1903 | Fetzer | |
| 806,826 A * | 12/1905 | McQuillin | 172/558 |
| 832,225 A * | 10/1906 | Wright | 172/182 |
| 894,316 A * | 7/1908 | Edwards | 384/157 |
| 905,786 A | 12/1908 | Biesenthal | |
| 942,282 A * | 12/1909 | Rasmussen | 172/156 |
| 989,748 A | 4/1911 | Adams | |
| 1,105,570 A | 7/1914 | Lea et al. | |
| 1,298,209 A | 3/1919 | Heylman | |
| 1,410,883 A * | 3/1922 | Bozard | 172/560 |
| 1,457,960 A * | 6/1923 | Britten | 172/168 |
| 1,536,367 A * | 5/1925 | Ferdinand | 172/558 |
| 1,723,705 A | 8/1929 | Packer | |
| 2,442,727 A | 6/1948 | Hyland | |
| 2,662,460 A | 12/1953 | Klemm et al. | |
| 2,917,012 A * | 12/1959 | Oehler et al. | 111/157 |
| 2,949,968 A | 8/1960 | Stoner | |
| 3,101,793 A * | 8/1963 | Brown et al. | 172/609 |
| 3,640,348 A * | 2/1972 | Womble | 172/572 |
| 3,835,933 A * | 9/1974 | Coski | 172/518 |
| 4,628,840 A * | 12/1986 | Jacobson | 111/121 |
| 4,716,971 A * | 1/1988 | Lanham | 172/39 |
| 4,828,042 A * | 5/1989 | Arnold | 172/572 |
| 5,267,619 A * | 12/1993 | Eversole | 172/572 |
| 5,297,497 A * | 3/1994 | Schmidt | 111/200 |

(Continued)

*Primary Examiner*—Thomas B Will
*Assistant Examiner*—Jamie L McGowan
(74) *Attorney, Agent, or Firm*—Rebecca Henkel

(57) ABSTRACT

A bearing shield and disk scraper system to remove and deflect dirt, debris, and soil from a bearing assembly, rigid bearing hanger or standard, and/or disk blade, is provided; the system also provides a protective barrier structure for the bearing assembly. The bearing shield and disk scraper system includes a shield member and a scraper blade connected thereto. The bearing shield at least partially encases and protects a bearing assembly that rotatably supports a common axle which carries multiple disk blades of the disk gang. The scraper blade is attached to the shield member by way of a mounting flange that extends therefrom. An edge of the scraper blade is positioned in close proximity to a concave surface of an adjacent disk blade, whereby the entire assemblage of bearing shield and disk scraper system protects the bearing assembly and prevents non-desired accumulation of dirt and debris on the disk blade.

17 Claims, 4 Drawing Sheets

U.S. PATENT DOCUMENTS

| | | | |
|---|---|---|---|
| 5,431,233 A * | 7/1995 | Schmidt | 172/588 |
| 5,507,351 A * | 4/1996 | Martin | 172/558 |
| 5,611,292 A * | 3/1997 | Clark et al. | 111/189 |
| 5,626,196 A * | 5/1997 | Hughes | 172/558 |
| 5,884,711 A * | 3/1999 | Shoup | 172/610 |
| 6,024,179 A * | 2/2000 | Bourgault | 172/566 |
| 6,237,696 B1 | 5/2001 | Mayerle | |
| 6,237,697 B1 * | 5/2001 | Butterfield et al. | 172/566 |
| 6,260,632 B1 * | 7/2001 | Bourgault et al. | 172/566 |
| 6,666,281 B2 * | 12/2003 | Fleischmann et al. | 172/508 |
| 6,726,368 B2 * | 4/2004 | Peeters | 384/477 |
| 6,874,584 B2 | 4/2005 | Butterfield et al. | |
| RE38,974 E * | 2/2006 | Gengler et al. | 172/574 |
| 7,481,171 B2 * | 1/2009 | Martin | 111/121 |
| 7,481,279 B2 * | 1/2009 | Blunier et al. | 172/558 |
| 2006/0225901 A1 | 10/2006 | Blunier et al. | |

\* cited by examiner

RIGID STANDARD BEARING SHIELD DISK SCRAPER SYSTEM

FIELD OF THE INVENTION

The invention relates generally to a shield and scraper system for a disk configuration of an agricultural implement, and more specifically, to a bearing shield and disk scraper system, i.e., shield and scraper system, for use with disk harrows that have rigid bearing hangers or bearing standards. The shield and scraper system is mounted to a bearing assembly at the lower end of the rigid standard and deflects soil, dirt, or debris. In particular, this configuration prevents the soil, dirt, or debris from accumulating between the adjacent disk blades which border the rigid bearing standard, while protecting the bearing assembly.

BACKGROUND OF THE INVENTION

Agricultural soil preparation equipment typically includes a disk configuration, commonly referred to as a disk or disk harrow, to be used for breaking up and smoothing the surface of cultivated fields in preparation for planting. In addition to planting preparation, disk harrows are increasing in popularity as a necessary implement for crop residue management. Modern plant varieties produce relatively higher yields, are physically and structurally tougher, and leave behind relatively more residue than previously. The disk harrow is usually drawn by a tractor or other source of motor power; multiple disk gangs are often employed in a single disk harrow. In disk harrows which incorporate multiple disk gangs, a forward disk gang initially cuts residue or breaks up lumps and clods, and a rear disk gang reduces the residue of dirt fragments to a still smaller size and smoothes the ground. Accordingly, the residue is reduced in size and mixed with the dirt or soil, which increases its decomposition or breakdown rate.

Typical disk harrows include a main frame with several disk gang assemblies suspended therefrom. The disk gangs are generally mounted at an angle with respect to the forward direction of travel. Each of the disk gangs includes a plurality of equally spaced disk blades mounted on an axle for rotation about a common axis. The axle is supported by a series of elongate, rigid bearing hangers or rigid standards. The rigid standards support a bearing assembly which rotatably supports the axle. Namely, the rigid bearing standards span between and connect the axle to an overlying horizontal tubular member, commonly referred to as a toolbar.

In wet weather or in heavy, sticky soil conditions, earth tends to cling to the disk blades. In order to smooth the ground properly, it is desirable that this earth be removed frequently or even continuously. Otherwise the accumulation of soil and residue adhering to the disks can adversely affect disk operation. To eliminate the accumulation of soil and residue, scraper devices have been developed to keep the surfaces of the disks, near their circumferences, clear of the soil and residue.

U.S. Pat. No. 4,127,179 discloses a scraper mechanism for a disk gang harrow. The scraper mechanism includes a scraper blade supported from a mounting bracket fixedly attached to a toolbar of an agricultural implement to be towed. The scraper blade is generally aligned in a downward direction so as to bias against the disk blade. An axle of the disk gang passes through bearing assemblies which are suspended and supported by bearing-support arms that extend down from the toolbar and are rigidly supported therefrom. Soil and residue flow tend to be carried from the rear of the rotating blades, up and forward over the top of the disk gang spools, and become trapped behind the disk gang standard and on the top of the gang bearing assembly. When this happens, the soil and residue mixture can be compacted between the disk blades and the standard and prevent the proper operation of the disk gang.

As shown and described in copending and commonly assigned U.S. application Ser. No. 11/096,400, filed on Apr. 1, 2005 and published on Oct. 12, 2006 as U.S. publication No. 2006/0225901, other disk scraping configurations have been developed, including various ones with scraper blades mounted to elongate brackets which do not provide enclosure-type protection for bearing assemblies.

SUMMARY OF THE INVENTION

There is a need for a rigid standard bearing shield and disk scraper system that is operable to prevent soil from being carried up and forward over the top of the disk gang bearings and packing against or otherwise collecting at the rigid standards. There is also a need for a shield which protects the bearing assembly located at the lower end of the rigid standard.

The present invention provides a rigid standard bearing shield and disk scraper system that meets the desires and needs described above, while being used, e.g., in combination with a disk gang of an agricultural implement. In a first embodiment of the present invention, a bearing shield and disk scraper system to remove and deflect dirt, debris, and soil from a bearing assembly, disk blade, and rigid standard, is provided. The system also provides a protective barrier structure which at least partially encapsulates the bearing assembly. In addition, the system includes a bearing shield member which has, e.g., a bottom wall and a sidewall. The sidewall of the bearing shield is attached to the bearing assembly such that the bearing shield member covers at least a portion of the bearing assembly. The shield member further includes a mounting flange connected to and extending rearwardly from the bearing shield member. A scraper blade is removably attached to the mounting flange and interfaces a surface of a disk blade.

It is contemplated that a depression extends into a perimeter edge of the bottom wall, and a portion of the bearing assembly extends through the bottom wall depression. Preferably, the bottom wall has, for example, first and second curved edges. Such curved edges correspond in shape and radii to the profile shape of an axle spool, and the characteristics of a concave surface of a disk blade. In this configuration, the bottom wall can be tightly or closely nested between the axle spool and the disk blade, preferably without physically contacting either.

It is further contemplated for the shield member to include a back wall that extends between the sidewall and the bottom wall. The bottom wall, sidewall, and back wall, in combination, define a partial box-type structure which encapsulates or otherwise surrounds and covers portion(s) of the bearing assembly. The back wall has a diagonal or sloped edge from which the mounting flange extends. The angle of the sloped edge, and thus the plane upon which the mounting flange lies, is selected based on the desired use angle of the scraper blade. The relative angle defined between the scraper blade and the disk blade provides debris flow characteristics suitably to divert dirt, soil, or debris, away from the disk, bearing assembly, and rigid standard. While the scraper blade directs the dirt and debris flow in such a manner, the shield assembly simultaneously provides physical protection to multiple surfaces of the bearing assembly.

In a still further embodiment, the rigid standard bearing shield and disk scraper system enjoys a relatively low height profile. In other words, the entire system extends from the axle in, generally, a radial only direction, whereby the scraper blade lies, to a large extent, upon the same plane as the shield member. In this configuration, non-desired effects of torsional forces between the scraper blade and its mounting location to the disk gang are mitigated, in contrast to if the scraper blade were instead mounted to an elongate bracket. During use, since the scraper blade is mounted to the shield member by way of the mounting flange, the scraper blade is held in a substantially stable position.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
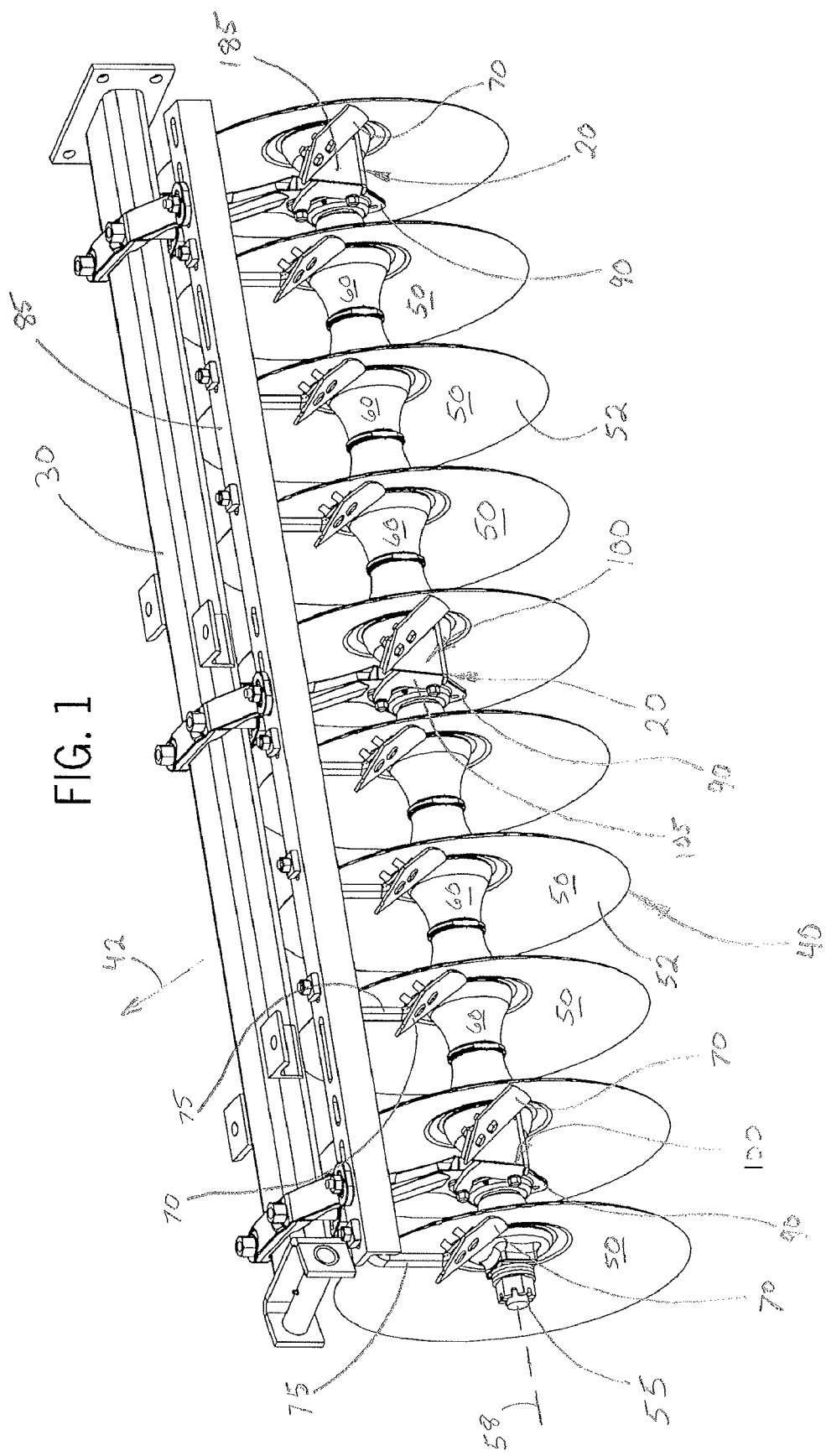
FIG. 1 illustrates a detailed rearward perspective view of a disk gang incorporating a first embodiment of a rigid standard bearing shield and disk scraper system in accordance with the present invention.

FIG. 1 shows a preferred embodiment of a rigid standard bearing shield and disk scraper system, namely, shield and scraper system 20, is employed on a disk gang 40. A tube or toolbar 30 is part of, and pivotably mounts the disk gang 40 to, an agricultural tillage or soil-working implement (not illustrated). Thus, the agricultural implement includes a toolbar 30 which supports one or more disk gangs 40 that are operable to cut and reduce the size of residue, or to break up lumps, clods, or soil to smaller sized fragments for residue management or for smoothing the ground.

Although no specific agricultural implement is illustrated, it is well understood that disk gang 40 can be incorporated into any of a variety of suitable disk harrows or other implements. Numerous suitable disk harrows include various ones manufactured by CNH America LLC, such as the Case IH model RMX370 Tandem Disks, and others.

The one or more disk gangs 40 are supported from the toolbar 30 so as to be to be towed in a forward direction, illustrated by the reference arrow 42 in FIG. 1, over the soil where crop residue or other material is present. The disk gang 40 is attached to the toolbar 30 of the agricultural implement by one or more rigid bearing hangers such as rigid standards 45. The rigid standards 45 are configured in a convention manner to rigidly support the disk gang 40 from the toolbar 30.

Figure 5:
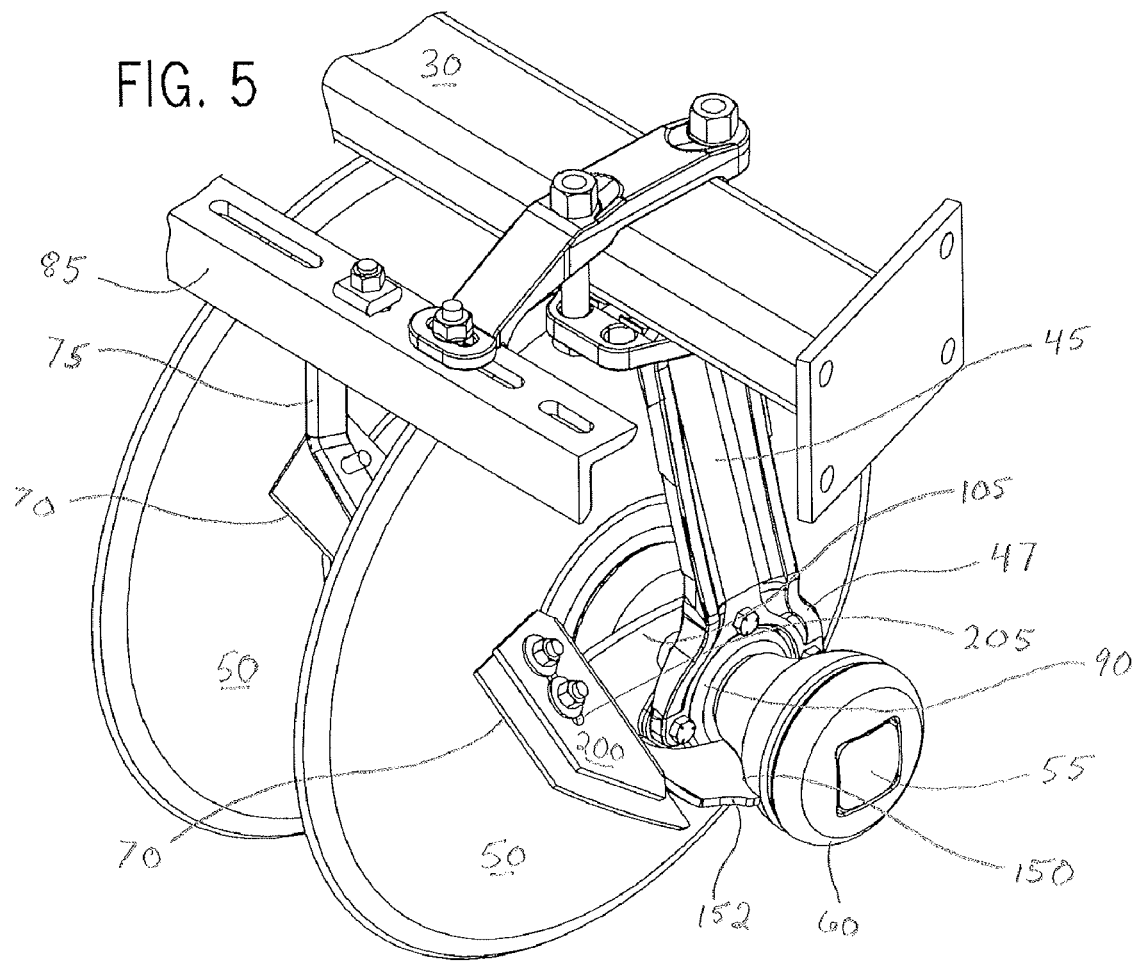
FIG. 5 illustrates a second detailed rearward perspective view of the rigid standard bearing shield and disk scraper system, and a portion of the disk gang shown in FIG. 1, the end disk blade removed.
Figure 6:
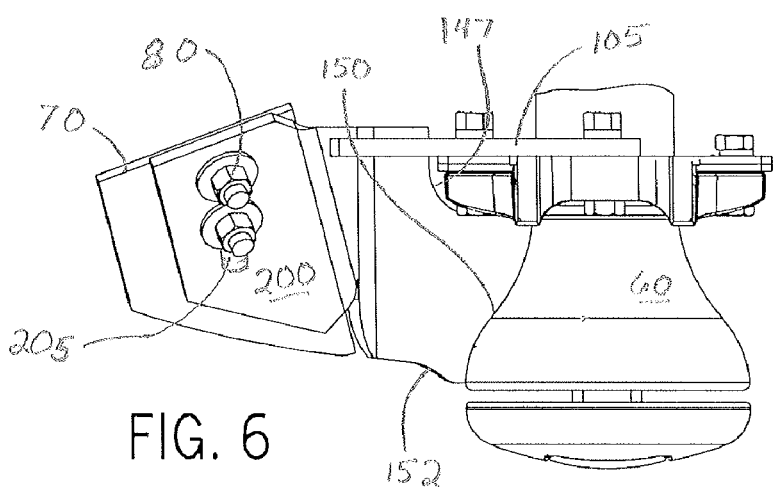
FIG. 6 illustrates a top plan view of the rigid standard bearing shield and disk scraper system of FIG. 1.

Each of the rigid standards 45 is preferably a solid cast-iron component, optionally a steel tubular member. The upper ends of the rigid standards 45 clamp to or are otherwise suitably attached to the toolbar 30. The lower ends of the rigid standards 45 have bearing receivers 47 which are, for example, forked openings with arcuate inner surfaces (FIG. 5). The bearing receivers 47 accept and mount respective bearing assemblies 90 therein. In particular, an outer circumferential surface of the bearing assembly 90 is nested in an interfacing relationship with the inner surface bearing receiver 47. Bearing fasteners 81 removably secure bearing assembly 90 into the bearing receivers 47.

The preferred disk gang 40 generally includes a series of transversely spaced disk blades 50 mounted for rotation in unison on a common axle 55 extending generally parallel to the toolbar 30. The common axle 55 is defined by and rotates about axis 58. The series of disk blades 50 are slidably spaced apart from one another by conventional sleeves or spools 60 along the common axle 55. The spools 60 in combination with conventional bearing assemblies 90 rotatably support the disk gang 40 on the common axle 55. As the toolbar 30 and disk gang 40 are moved in the forward direction 42 through the soil, the disk gang 40 is operable in a conventional manner to cut and mix residue, break-up lumps and clods of soil and debris to reduce fragments to still smaller-size, and to mix and smooth the soil surface in, e.g., preparation for planting or for residue management.

During use, dirt and debris tend to build up on the surfaces of the disk gang 40 between the individual disk blades 50. This dirt and debris must be removed to maintain good operation of the disk gang 40 in properly working the soil. Dirt and debris accumulates in different ways at various portions of the disk gang 40, whereby multiple methods are preferably used to suitably remove or prevent accumulating dirt and debris at different locations on the gang 40.

As one example, between most adjacent pairs of disk blades 50 along the length of axle 55, accumulating dirt and debris is adequately removed by various scraper blades 70. Each of the blades 70 is supported by an arm member 75, FIG. 2, which is attached to the toolbar 30 or to a mounting bracket 85 that extends generally parallel to the axle 55. The arm member 75 includes a linear elongated metallic piece comprised of spring steel or other appropriate material operable to bias the scraper blade 70 against the surface of the disk blade 50.

The scraper blade 70 is generally mounted at an angle to effect a scraping action on the concave sides or surfaces 52 of the disk blade 50 in a conventional manner. The location of the scraper blade 70 relative to the respective disk blade 50 is generally identical for each of the series of disk blades 50 of the disk gang 40.

The scraper arm member 75 is configured to support and bias the scraper blade 70 against the surface of the disk blade 50. This alignment of the scraper arm member 75 holds the scraper blade 70 above the spool 60 in a manner that enhances removal of soil and debris attached to the disk blade 50. This alignment and location of the scraper arm member 75 also places the scraper blade 70 above the spool 60 at a location out of the primary soil flow path, minimizing the potential for damage to the scraper arm member 75 and the scraper blade 70. The preferred scraper arm member 75 generally includes a linear elongated metallic piece comprised of spring steel or other appropriate material operable to maintain a bias of the scraper blade 70 against the disk blade 50.

While scraper blades 70 are adequate for removing or preventing accumulating dirt and debris at some portion of disk gang 40, they prove relatively less effective at other locations upon the disk gang 40. For example, since scrapers blades 70 are angularly mounted, they tend to deflect the dirt and debris axially away from the surfaces of the disk blades 50. The deflected dirt and debris correspondingly flows between the adjacent disk blades 50.

However, some disk blades 50 have intervening structure(s) between them, such as the rigid standards 45 and bearing assemblies 90. Accordingly, dirt and debris can accumulate at the rigid standards 45 and the bearing assemblies 90, despite the utilization of scraper blades 70. To prevent or mitigate this, rigid standard shield and scraper system 20 is provided. Rigid standard shield and scraper systems 20 can be used in addition to or in lieu of scraper blades 70 at or near, for example, rigid standards 45 and bearing assemblies 90 of the disk gang 40.

Referring specifically to FIGS. 2, 3, and 5-6, shield and scraper system 20 includes, e.g., shield member 100, mounting flange 200, and scraper blade 70. In general, the shield member 100 cups, partially envelopes, or otherwise covers and protects portions of, bearing assembly 90. The mounting flange 200 extends outwardly and rearwardly from the shield member 100 and provides a mounting structure for scraper blade 70, enabling it to removably attach to the shield member 100.

Shield member 100 includes sidewall 105, bottom wall 145, and back wall 185. The various components of shield member 100 can be individual, distinct members or integral with various other components, as desired. For example, sidewall 105 can be a separate mounting plate which is mechanically attached to, welded, adhered, or otherwise fixed to, the remainder of shield member 100. Optionally, the shield member 100 can be stamped, forged, or cast as a single unit.

Figure 3:
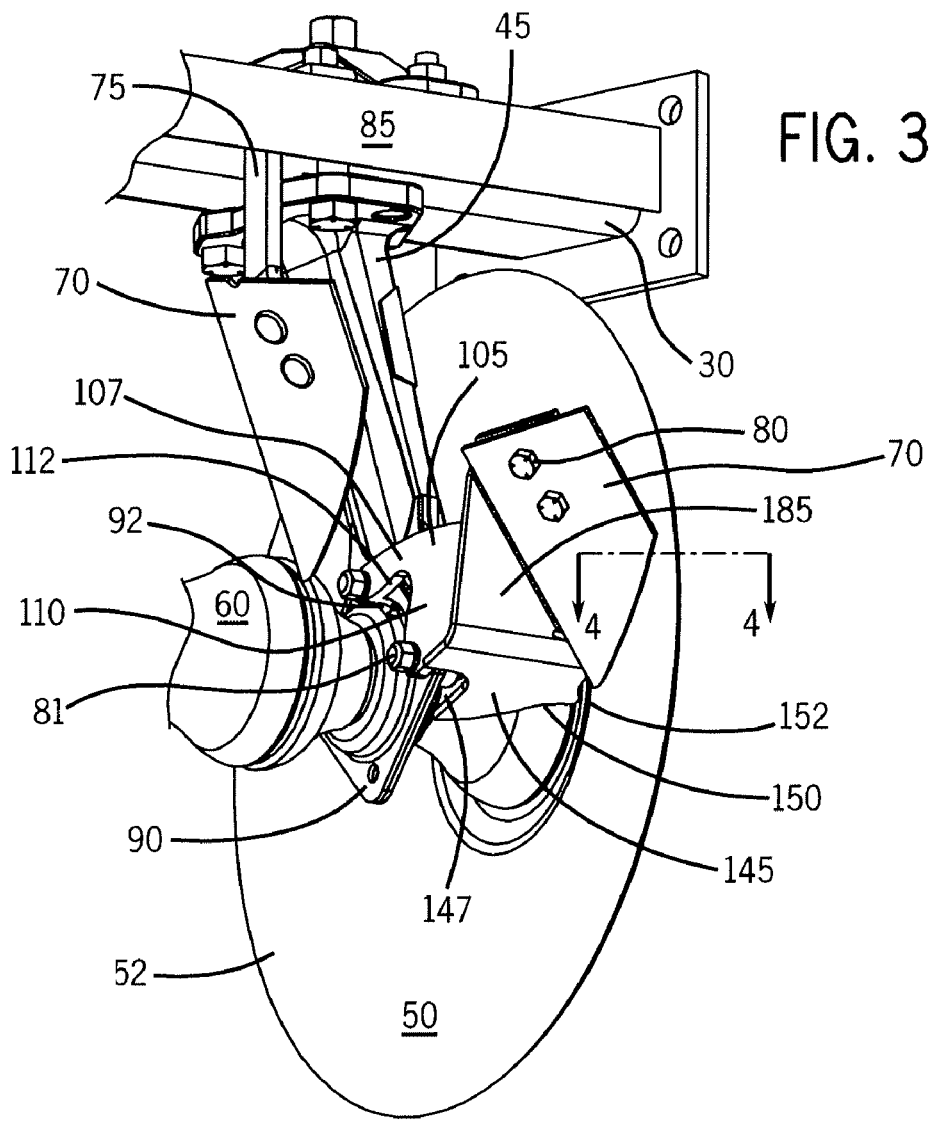
FIG. 3 illustrates a first detailed rearward perspective view of the rigid standard bearing shield and disk scraper system and a portion of the disk gang shown in FIG. 1.

The sidewall 105 is generally "L-shaped" and thereby has a horizontal segment 107, a vertical segment 110, and an inwardly extending notch 112. A throughbore extends through each of the ends of the horizontal and vertical segments 107 and 110, respectively. Preferably, the throughbores are spaced from each other by a distance that corresponds to that between the bearing fasteners 81 which secure the bearings assemblies 90 to the bearing receivers 47. In this configuration, the bearing fasteners 81 are used to secure the sidewall 105, and thus shield member 100, to the bearing assembly 90 and rigid standard 45 (FIG. 3).

Sidewall 105 is sized, shaped, adapted, and configured according to the dimensions of bearing assembly 90. More specifically, the particular perimeter shape of sidewall 105 is selected so that the sidewall 105 cover, shields, or otherwise protects, at least a portion of the bearing assembly 90.

Furthermore, the sidewall 105 interfaces and cooperates with the bearing assembly 90 and the rigid standard, without compromising the typical use of the device. For example, referring to FIG. 3, in some embodiments, the bearing assembly 90 includes a grease fitting 92. In such embodiments, the void space of the notch 112 of sidewall 105 L-shaped configuration provides adequate clearance between the shield member 100 and the grease fitting 92, whereby it remains suitably accessible and usable.

Figure 2:
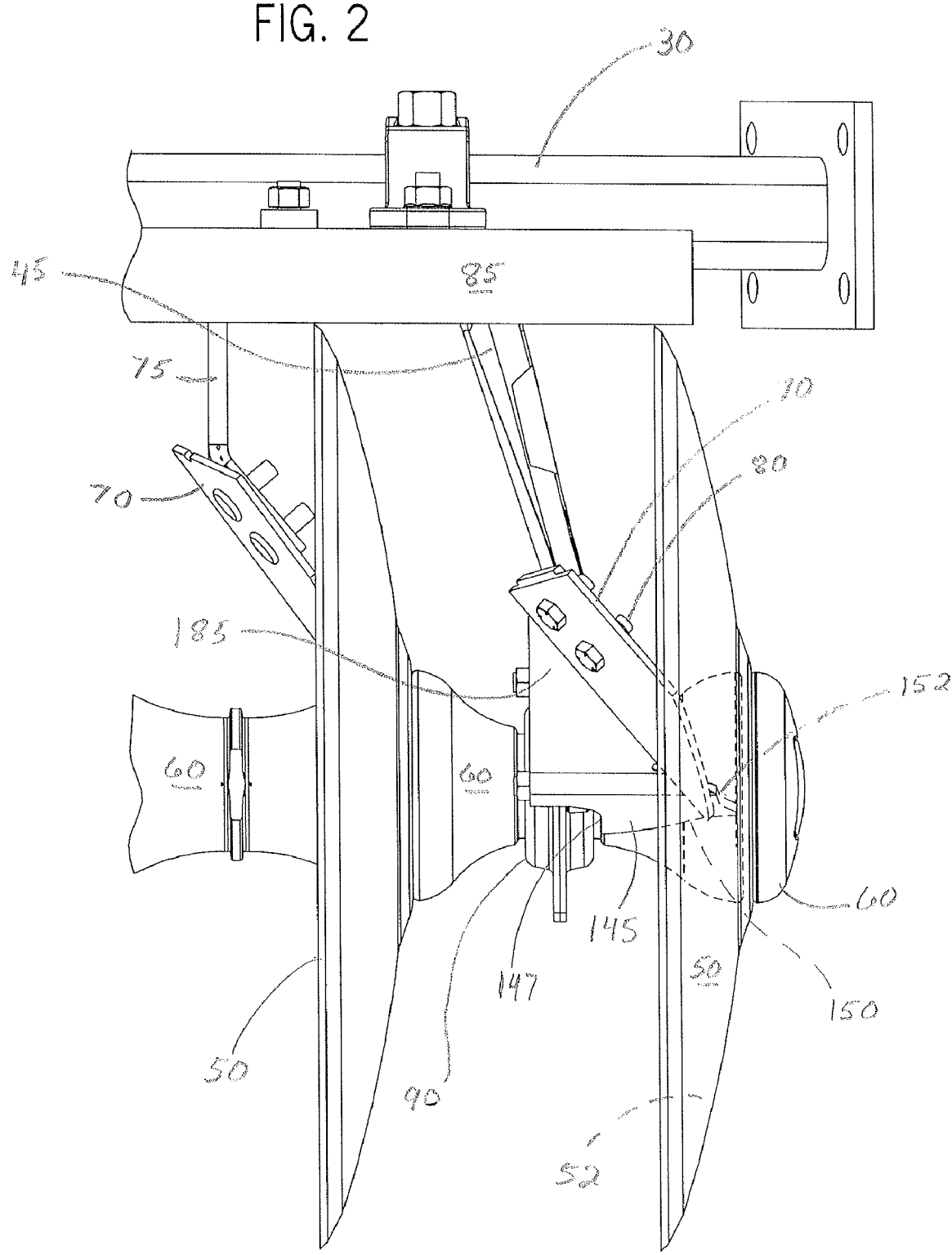
FIG. 2 illustrates a rear elevation of the rigid standard bearing shield and disk scraper system, and a portion of the disk gang, shown in FIG. 1.

Bottom wall 145 extends perpendicularly from a lowermost portion of sidewall 105. The part of bottom wall 145 which communicates with sidewall 105 extends generally under a portion of bearing assembly 90. Adjacent such portion is, e.g., a depression 147 extends into a perimeter edge of the bottom wall 145. Referring specifically to FIGS. 2-3, when the shield member 100 is mounted to the bearing assembly 90 or rigid standard 45, part of the bearing assembly 90 is housed in and extends through the depression 147. Accordingly, the bottom wall 145 serves as, e.g., a protector or skid-plate to portions of the bearing assembly and rigid standard 145.

The perimeter of bottom wall 145 further defines two curvilinear or curved segments, namely, spool edge 150 and disk edge 152. The contour and shape of spool edge 150 corresponds closely to the, for example, bell-shaped profile of spool 60. Accordingly, bottom wall 145 can sit immediately adjacent the spool 60 without contacting it and with a generally constant width clearance along the entire length of the spool edge 150. Similarly, the contour and shape of disk edge 152 corresponds closely to the concave surface 52 radius of disk 50. Therefore, bottom wall 145 can also sit immediately adjacent the disk 50 without contacting it and with a generally constant width clearance along the entire length of the disk edge 152. In other words, the portion of bottom wall 145, which is between the spool and disk edges 150, 152, is wedged between, but does not contact, the spool 60 and disk 50.

The rearward most end of disk edge 154 connects to a first lower corner of the back wall 185. Back wall 185 extends upwardly from the outer edge of bottom wall 145. The perimeter shape of back wall 185 is generally triangular, whereby it defines a vertical lateral edge and a sloping edge. The sloping edge extends from the top of the back wall 185, angularly down toward the disk 50 and spool 60. Preferably the forward 42 facing surface of the back wall 185 is connected to the rearward facing edge of sidewall 105, whereby the upwardly standing sidewall 105 and back wall 185, in combination, add rigidity and vertical load bearing capacity to the shield member 100.

Mounting flange 200 extends generally perpendicularly or horizontally away from the shield member 100, namely, the back wall 185. As for the vertical orientation, the top of the mounting flange 200 leans or angles down away from vertical and away from the disk 50. The magnitude of the lean angle of flange 200 is the same as that of the slanted edge of back wall 185. This is due to flange 200 extending out from the slanted edge of back wall 185, whereby, since flange 200 is planar, the angle necessarily is the same. The lower planar surface of flange 200 and the elongate slots 205 enable a conventional scraper blade 70 to be adjustably mounted to the flange 200.

Flange 200 mounts the scraper blade 70 at a relatively greater angle, closer to perpendicular with respect to disk 50, than the orientations of scraper blades 70 mounted to arm members 75. The particular angle is selected based on, for example, the flow characteristics of the soil, dirt, or debris. In particular, flange 200 positions blade 70 at an angle to suitably direct the dirt or debris flow axially away from the rigid standard 45 and the bearing assembly 90.

Preferably, the various dimensions of shield member 100 and mounting flange 200 are such that, in the entire assemblage, the lowermost portion scraper blade 70 extends below at least part of the bottom wall 145 and below at least the top surface of axle 50. Accordingly, in this configuration, the entire shield and scraper system 20 defines a relatively low profile.

With such a low profile, the shield and scraper system 20 extends predominantly radially outwardly away from axle 50, and scraper blade 70 is in close proximity to the bearing assembly 90. It is also readily apparent that in such low profile configuration(s), the shield and scraper system 20 is devoid of, for example, any elongate brackets or other mounting structure which is susceptible to bending, twisting, and/or experiencing other non-desired articulations. To the contrary, the scraper blade 70 is mounted directly, by way of flange 200, to a substantially rigid, partially boxed structure, namely, shield member 100.

In light of the above, to use the device, the shield member 100 is first mounted to the bearing assembly 90 and/or rigid standard 45 by way of bearing fasteners 81 extending through the throughbores of sidewall 105. At this point, the shield member 100 at least partially encases, envelopes, cups, or otherwise covers a portion of the bearing assembly 90 or rigid standard 45.

Figure 4:
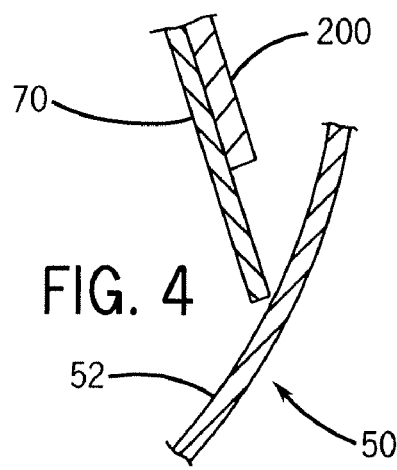
FIG. 4 illustrates a cross-section view of a scraper blade, mounting flange, and disk blade, taken at line 4-4 in FIG. 3.

Next the scraper blade 70 is connected to the shield member 100, through the mounting flange 200. Mounting apertures through scraper blade 70 are preliminarily aligned with the elongate slots 205 through mounting flange 200. The apertures and slots are easily registered with each other by positioning the upper surface of the scraper blade 70 against the lower surface of the mounting flange 200; thence, sliding the scraper blade 70 in the forward direction 42 until it is mechanically stopped by the back wall 185 of shield member 100. Blade fasters 80 loosely, and preliminarily, attach and hold the scraper blade 70 against mounting flange 200. At that point, the clearance between the scraper blade 70 and disk 50 (FIG. 4) is determined by sliding the scraper blade 70 with respect to the mounting flange, and thus sliding fasteners 80 through slots 205. The sliding adjustment is continued until the desired distance is established between the arcuate scraper blade edge and the concave surface 52 of disk 50, at which point the blade fasteners 80 are tightened and the position of scraper blade 70 is fixed.

While the invention has been shown and described with respect to particular embodiments, it is understood that alternatives and modifications are possible and are contemplated as being within the scope of the present invention. A wide variety of ground-engaging implements (e.g., conventional disk harrow) can employ the shield and scraper system 20 of the present invention. In addition, it should be understood that the number of shield and scraper systems 20 employed on the disk gang 40 is not limiting on the invention.

Many changes and modifications could be made to the invention without departing from the spirit thereof. The scope of these changes will become apparent from the appended claims.

We claim:

1. A bearing shield and disk scraper system for use with a rigid standard of a disk harrow having a disk blade carrying axle that is rotatably supported by a bearing assembly, comprising:
    a bearing shield including a bottom wall and a sidewall, the sidewall of the bearing shield being attached to the bearing assembly such that the bearing shield member covers at least a portion of the bearing assembly;
    a mounting flange connected to and extending rearwardly from the bearing shield member; and
    a scraper blade removably attached to the mounting flange and interfacing a surface of a disk blade;
    wherein the shield member has a back wall that extends between and connects the sidewall and the bottom wall;
    wherein the mounting flange is attached to the back wall.

2. The bearing shield and disk scraper system as in claim 1, wherein the scraper blade is adjustably attached to the mounting flange.

3. The bearing shield and disk scraper system as in claim 2, wherein the mounting flange includes elongate slots for adjusting the position of the scraper blade with respect to the mounting flange.

4. The bearing shield and disk scraper system as in claim 1 further comprising an axle spool concentrically mounted to the axle and having a profile shape, and wherein the bottom wall has a curved edge which corresponds in shape to the profile shape of the axle spool.

5. The bearing shield and disk scraper system as in claim 1, wherein the disk blade has a concave surface, defining a radius thereof, and the bottom wall has a curved edge which corresponds in shape to the radius of the concave surface the disk blade.

6. The bearing shield and disk scraper system as in claim 1, wherein the scraper blade is mounted to the lower surface of the mounting flange.

7. A bearing shield and disk scraper system for use with a rigid standard of a disk harrow having a disk blade carrying axle that is rotatably supported by a bearing assembly, comprising:
    a bearing shield member including a bottom wall, a sidewall, and a back wall which extends between and connects the bottom wall and sidewall, the bottom wall, sidewall, and back wall, defining a shield cavity therebetween;
    a mounting flange angularly extending from the bearing shield member; and
    a scraper blade removably attached to the mounting flange and interfacing a surface of a disk blade, wherein the bearing shield is mounted to the bearing assembly such that a portion of the bearing assembly is housed within the bearing shield cavity;
    wherein the bottom wall has a notch extending into a perimeter edge.

8. The bearing shield and disk scraper system as in claim 7, wherein the bearing assembly extends downwardly through the notch of the bottom wall.

9. The bearing shield and disk scraper system as in claim 7, wherein the bottom wall has a curved edge which corresponds in shape to a profile shape of an axle spool which is concentrically mounted to the axle.

10. The bearing shield and disk scraper system as in claim 7, wherein the disk blade has a concave surface, defining a radius thereof, and the bottom wall has a curved edge which corresponds in shape to the radius of the concave surface the disk blade.

11. The bearing shield and disk scraper system as in claim 7, wherein the scraper blade is attached to the bottom surface of the mounting flange.

12. The bearing shield and disk scraper system as in claim 7, the position of the scraper blade is adjustable with respect to the mounting flange.

13. A bearing shield and disk scraper system for use with a rigid standard of a disk harrow having a disk blade carrying axle that is rotatably supported by a bearing assembly, comprising:
    a bearing shield member mounted to the bearing assembly and including a bottom wall and a sidewall, the bottom wall having a perimeter edge and a depression extending into the perimeter edge;
    a mounting flange angularly extending from the bearing shield member; and a scraper blade removably attached to the mounting flange and interfacing a surface of a disk blade, wherein a portion of the bearing assembly extends through depression in the bottom wall of the bearing shield member.

14. The bearing shield and disk scraper system as in claim 13 further comprising an axle spool concentrically mounted to the axle and having a profile shape, wherein a portion of the bottom wall extends between the disk blade and the axle spool.

15. The bearing shield and disk scraper system as in claim 14, wherein the bottom wall has a curved edge which corresponds in shape to the profile shape of the axle spool.

16. The bearing shield and disk scraper system as in claim 14, wherein the disk blade has a concave surface, defining a radius thereof, and the bottom wall has a curved edge which corresponds in shape to the radius of the concave surface the disk blade.

17. The bearing shield and disk scraper system as in claim 13, wherein a lowest portion of the scraper blade extends downwardly beyond an upper surface of the axle.

* * * * *